US008000245B2

(12) United States Patent
Rochon et al.

(10) Patent No.: US 8,000,245 B2
(45) Date of Patent: Aug. 16, 2011

(54) INTERNET PROTOCOL HEADER COMPRESSION REORDERING

(75) Inventors: Michel Rochon, Kanata (CA); Adrian Ellsworth, Stittsville (CA); Vernon Joshua Stanley Dennis, Kanata (CA)

(73) Assignee: Alcatel Lucent, Paris (FR)

( * ) Notice: Subject to any disclaimer, the term of this patent is extended or adjusted under 35 U.S.C. 154(b) by 141 days.

(21) Appl. No.: 12/362,239

(22) Filed: Jan. 29, 2009

(65) Prior Publication Data
US 2010/0188977 A1 Jul. 29, 2010

(51) Int. Cl.
*G01R 31/08* (2006.01)
(52) U.S. Cl. ........................................ 370/235
(58) Field of Classification Search .................. 370/292, 370/349, 395.21, 474, 412–417, 428, 429, 370/203, 229–235, 300, 389, 392, 395.1, 370/395.41, 395.5, 395.52, 395.53, 395.64
See application file for complete search history.

(56) References Cited

U.S. PATENT DOCUMENTS

| 5,828,653 | A  | * | 10/1998 | Goss ........................... 370/230 |
| 6,765,909 | B1 | * | 7/2004  | Sen et al. ..................... 370/392 |
| 7,006,472 | B1 | * | 2/2006  | Immonen et al. .............. 370/332 |
| 2002/0038385 | A1 | * | 3/2002  | Kalliokulju ................... 709/247 |
| 2002/0071432 | A1 | * | 6/2002  | Soderberg et al. ............ 370/389 |
| 2002/0097722 | A1 | * | 7/2002  | Liao et al. ..................... 370/392 |
| 2003/0112766 | A1 | * | 6/2003  | Riedel et al. .................. 370/252 |
| 2004/0081093 | A1 | * | 4/2004  | Haddock et al. ............... 370/230 |
| 2005/0008037 | A1 | * | 1/2005  | Koren et al. ................... 370/474 |
| 2006/0023705 | A1 | * | 2/2006  | Zoranovic et al. ............ 370/389 |
| 2006/0067213 | A1 | * | 3/2006  | Evans et al. ................... 370/229 |
| 2007/0109959 | A1 | * | 5/2007  | Koren et al. ................... 370/218 |
| 2008/0056273 | A1 | * | 3/2008  | Pelletier et al. ........... 370/395.21 |
| 2009/0034529 | A1 | * | 2/2009  | Dawdy .......................... 370/392 |
| 2009/0323707 | A1 | * | 12/2009 | Aimoto ......................... 370/401 |
| 2010/0172363 | A1 | * | 7/2010  | Sindhu et al. ................. 370/412 |

* cited by examiner

*Primary Examiner* — Kwang B Yao
*Assistant Examiner* — Jung Liu
(74) *Attorney, Agent, or Firm* — Kramer & Amado P.C.

(57) ABSTRACT

Various exemplary embodiments relate to a method and related network node including one or more of the following: receiving, at the network node, a packet belonging to a flow, the packet including a marking used to identify a quality of service (QoS) required for the packet; assigning a compression context identifier to the packet; queuing the packet in a queue selected from a plurality of queues based on the marking in the packet; identifying a period of congestion and, in response, blocking the packet; when the period of congestion has ended and the packet is dequeued, determining whether the QoS associated with the packet is the same as a QoS stored in a context identifier storage; and when the QoS associated with the packet is not the same as the QoS stored in the context identifier storage, determining that the flow has expired and discarding the packet.

16 Claims, 3 Drawing Sheets

| Flow Information | Context ID | QoS |
|---|---|---|
| Source IP/Port, Dest. IP/Port | 0 | 7 |
| Source IP/Port, Dest. IP/Port | 1 | 2 |
| ... | ... | ... |

INTERNET PROTOCOL HEADER COMPRESSION REORDERING

TECHNICAL FIELD

Embodiments disclosed herein relate generally to compression of Internet Protocol (IP) headers and, more particularly, to resolution of difficulties in a system that implements IP header compression and a traffic management function.

BACKGROUND

Modern packet-switched networks accommodate a greater number of users and larger amount of traffic than ever before. Unfortunately, the services desired by users now require a much greater amount of bandwidth, while demanding near real-time service in many cases. Consider, for example, a typical user's experience with a mobile phone. While, several years ago, many users were content with voice-only service, many mobile phones now double as personal computers, providing access to streaming video, peer-to-peer applications, and other high bandwidth applications. Furthermore, non-mobile networks have also experienced a significant increase in traffic, as Voice Over Internet Protocol (VoIP), IP Television (IPTV), and similar services have gradually increased in popularity.

Service providers have struggled to keep pace with the ever-increasing bandwidth requirements. Given the significant expenses associated with adding additional equipment, service providers are reluctant to address this problem by simply increasing the capacity of the network. Instead, many service providers desire to decrease costs and simultaneously improve the user's quality of experience by optimizing the efficiency of data transfer over the network.

One such optimization relates to compression of headers associated with packets transferred over the network. In bandwidth-sensitive portions of the network, many service providers employ a header compression algorithm to decrease the amount of data sent over the network. As an example, this header compression may be implemented according to Request For Comments 2507, "IP Header Compression," published by the Internet Engineering Task Force (IETF). More specifically, during an initialization phase, a node known as a compressor sends a full header including a context identifier, which uniquely identifies the flow associated with the packet. A node known as a decompressor receives the full header and stores the associated context identifier. Subsequently, the compressor may send a "compressed" version of the header, which includes the context identifier, but omits much of the information included in the full header. Because the decompressor maintains a record of the context identifier and associated header information, the decompressor may reconstruct the full header using the information contained in the compressed version.

A second optimization relates to traffic management services implemented by provider edge nodes. In particular, a typical provider edge node implements a service that prioritizes traffic. During periods of congestion, the node prioritizes high priority traffic, while temporarily blocking low priority traffic. This technique ensures that the most important traffic reaches its destination by delaying transmission of less important traffic until the congestion subsides.

In nodes that implement both header compression and traffic management services, a number of problems arise. One problem relates to compressed packets that are placed in a low priority queue, such that these packets are blocked during periods of congestion. While these packets are delayed, the underlying context identifier may expire, such that the context identifier may be reassigned to another flow. After the congestion ends, however, these packets may be dequeued from the low priority queue and sent across the network. As a result, when these packets are received at the decompressor, the decompressor will incorrectly forward the packets according to the full header associated with the reassigned context identifier or discard the packets as a result of a generation mismatch between the old packets and the new context at the decompressor. Furthermore, if the packets with an expired context identifier include a full header, these packets may reset the context identifier at the decompressor, such that the packets in the new flow may be incorrectly discarded until the decompressor receives another full header for the new flow.

For the foregoing reasons and for further reasons that will be apparent to those of skill in the art upon reading and understanding this specification, there is a need for a solution that resolves potential problems when a packet with a compressed header is queued in a node including a traffic management function.

SUMMARY

In light of the present need for a conflict-free interaction of packet header compression and traffic management functionality, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related network node including one or more of the following: receiving, at the network node, a packet belonging to a flow, the packet including a marking used to identify a quality of service (QoS) required for the packet; assigning a compression context identifier to the packet; queuing the packet in a queue selected from a plurality of queues based on the marking in the packet; identifying a period of congestion and, in response, blocking the packet; when the period of congestion has ended and the packet is dequeued, determining whether the QoS associated with the packet is the same as a QoS stored in a context identifier storage; and when the QoS associated with the packet is not the same as the QoS stored in the context identifier storage, determining that the flow has expired and discarding the packet.

Accordingly, various exemplary embodiments ensure a conflict-free interaction of packet header compression and traffic management functions in a network node. In particular, the various exemplary embodiments ensure that full header packets belonging to an expired flow with a given context identifier do not interfere with the new compression context established when the context identifier is reassigned. Furthermore, the various exemplary embodiments ensure that compressed packets associated with an expired flow are not sent to a decompressor after a new compression context is established, thereby reducing the possibility of errors at the ultimate destination of the packets.

BRIEF DESCRIPTION OF THE DRAWINGS

In order to better understand various exemplary embodiments, reference is made to the accompanying drawings, wherein.

DETAILED DESCRIPTION

Figure 1:
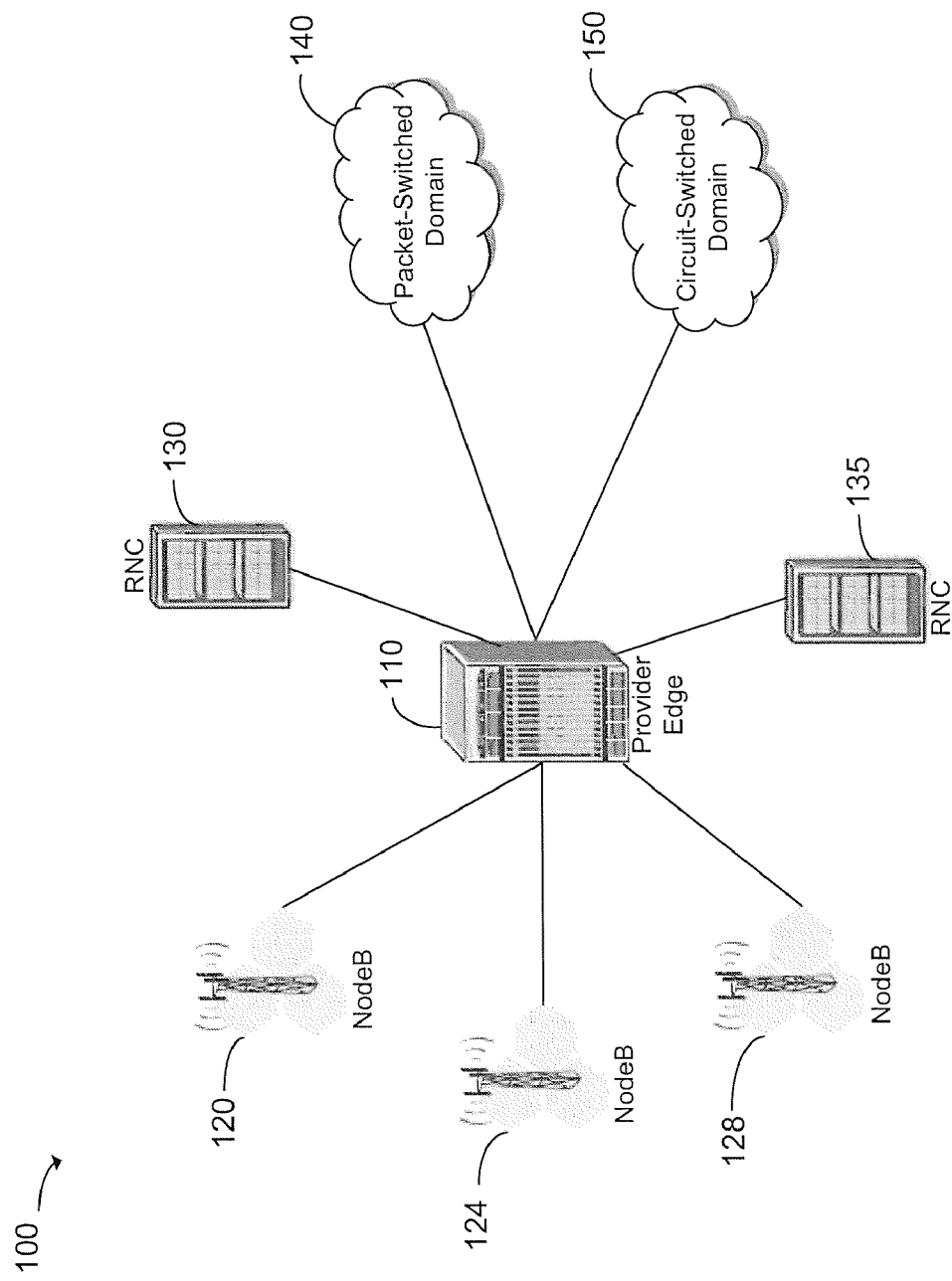
FIG. 1 is a schematic diagram of an exemplary system including a provider edge node that verifies header compression context identifiers prior to forwarding of packets.

Referring now to the drawings, in which like numerals refer to like components or steps, there are disclosed broad aspects of various exemplary embodiments.

FIG. 1 is a schematic diagram of an exemplary system 100 including a provider edge node 110 that verifies header compression context identifiers prior to forwarding of packets. In various exemplary embodiments, system 100, which may be a telecommunications network, includes provider edge node 110, a plurality of wireless base stations 120, 124, 128, a plurality of radio network controllers (RNC) 130, 135, a packet-switched domain 140, and a circuit-switched domain 150.

Provider edge node 110 may be a router including a plurality of cards configured to exchange packets and other data between the components of system 100. In particular, node 110 may aggregate and connect a plurality of wireless base stations 120, 124, 128 to a plurality of RNCs 130, 135. Additionally, node 110 may be configured to receive data from packet-switched domain 140 or circuit-switched domain 150 and forward this data to user nodes through wireless base stations 120, 124, 128.

As described in further detail below with reference to FIG. 2, node 110 may implement packet header compression of packets to preserve bandwidth, particularly when transmitting data to wireless base stations 120, 124, 128 for wireless transmission. The header compression performed by node 110 may be accomplished in accordance with Request For Comments (RFC) 2507, published by the Internet Engineering Task Force, or any similar methodology known to those of skill in the art.

Thus, node 110 may receive a packet for forwarding and determine an appropriate context identifier for the flow associated with the packet. The context identifier may be any value used to uniquely identify a flow between node 110 and the destination that will decompress the packet, known as the decompressor. Node 110 may also generate a value known as the generation, which is a value that is incremented or otherwise modified each time the context is changed. After generating the context identifier and generation value, node 110 may store these values for subsequent retrieval.

When a packet received at node 110 is the first packet in a flow, compressor 110 may assign a new context identifier and generation to the flow, then send a full header for the packet to the decompressor. The full header will include the context identifier, generation, and all information required to identify the flow and reconstruct a full packet header.

When a received packet is a subsequent packet in the flow, node 110 may access the information in the packet header, look up the corresponding context identifier and generation, then send a compressed packet including the context identifier and generation. Again, for packets including full headers, the context identifier and generation may be placed in the packet length field of the header. For packets with compressed headers, the header format may include space for the context identifier and generation. Furthermore, the compressed packet may exclude information that remains constant between packets, such as the source address, source port, destination address, destination port, time-to-live (TTL), etc.

In addition, as also described in further detail below with reference to FIG. 2, node 110 may provision quality of service (QoS) to flows handled by node 110. In particular, node 110 may include a traffic manager that manages the buffer in node 110 to prevent buffer overruns. In addition, node 110 includes a plurality of queues, each queue corresponding to a different QoS. Thus, node 110 directs packets to an appropriate outgoing queue based on a marking in the packet.

According to the various exemplary embodiments, node 110 includes components that interact to ensure that packets outputted from a given queue are not associated with an aged-out or expired flow for which the context identifier has been reassigned. In operation, when node 110 receives a packet belonging to a flow, node 110 assigns a compression context identifier and generation to the packet. Node 110 then queues the packet in a queue selected based on the marking.

During periods of congestion, node 110 preferentially forwards packets in the queues with a higher quality of service, such that packets in a queue with a lower quality of service may be temporarily delayed. During this congestion, if a given flow has been inactive for a predetermined inactivity period, the flow's context identifier may expire, such that the expired context identifier may be reassigned for compression of a new flow. As a result, in some circumstances, a context identifier may be reassigned while packets associated with the context identifier are still waiting for output in one or more of the lower priority queues. In known systems, after the period of congestion has expired, these packets are outputted from the lower priority queues, such that the packets are forwarded at the decompressor using the flow information associated with the new context identifier. Furthermore, in the event that the lower priority queues include one or more full headers with the old flow information, known systems would forward these packets to the decompressor, thereby resetting the compression context and potentially resulting in loss of data for the new flow.

Node 110 may be configured to address these problems. In particular, node 110 may include a mechanism to ensure that packets outputted from a queue are not forwarded when they are associated with an expired compression context that has been reassigned. In particular, node 110 may determine the quality of service associated with a packet at the time the packet is dequeued and compare this quality of service with a value stored in node 110 in association with the context identifier. When these values are not equal, node 110 may infer that the packet is associated with an expired context identifier and discard the packet. Alternatively, when the values are equal, node 110 may infer that the packet is likely associated with a non-expired context identifier and forward the packet.

It should be apparent that the above description of the operation of node 110 is intended to provide an overview of the operation of node 110 and is a simplification in some respects. The detailed operation of the components of node 110 will be described in further detail below with reference to FIG. 2.

Wireless base stations 120, 124, 128 may be devices including an antenna to wirelessly exchange data with a plurality of user nodes (not shown) over a plurality of radio channels. These user nodes may be, for example, mobile phones, personal computers, personal digital assistants, wireless email devices, and the like. Wireless base stations 120, 124, 128 may include wire line interfaces to forward data into provider edge node 110. Thus, wireless base stations 120, 124, 128 may be Node Bs in a 3G network or other base transceiver stations communicating in a Global System for Mobile Communications (GSM), Universal Mobile Telecommunications System (UMTS), Long Term Evolution (LTE) network, or other network.

Radio network controllers 130, 135 may be configured to manage a plurality of wireless base stations 120, 124, 128 through node 110. Thus, radio network controllers 130, 135 may direct the transmission and reception of data in wireless base stations 120, 124, 128 by controlling the radio transmitters and receivers in wireless base stations 120, 124, 128. It should be apparent that radio network controllers 130, 135 may be replaced by base station controllers or other devices capable of directing the operation of wireless base stations 120, 124, 128.

Packet-switched domain 140 may be a network connected to node 110 for receiving and transmitting packets. In particular, packet-switched domain 140 may include components configured to receive and forward packets from a packet-switched network, such as the Internet. Thus, packet-switched domain 140 may include a Serving General Packet Radio Services Support Node (SGSN) and a Gateway General Packet Radio Services Support Node (GGSN). Other suitable components for inclusion in packet-switched domain 140 will be apparent to those of skill in the art.

Circuit-switched domain 160 may be a network connected to node 110 for receiving and transmitted circuit-switched data. In particular, circuit-switched domain 160 may include components configured to receive and forward data from a circuit-switched network, such as the Public-Switched Telephone Network (PSTN). Thus, circuit-switched domain 150 may include a Mobile Switching Center (MSC) and a Gateway Mobile Switching Center (GSMC). Other suitable components for inclusion in circuit-switched domain 150 will be apparent to those of skill in the art.

It should be apparent that the description of system 100 as being a wireless network is exemplary. Thus, system 100 may instead include portions in which satellite-based or wireline communications are implemented. Suitable variations of system 100 in which node 110 is implemented will be apparent to those of skill in the art.

Figures 2, 3:
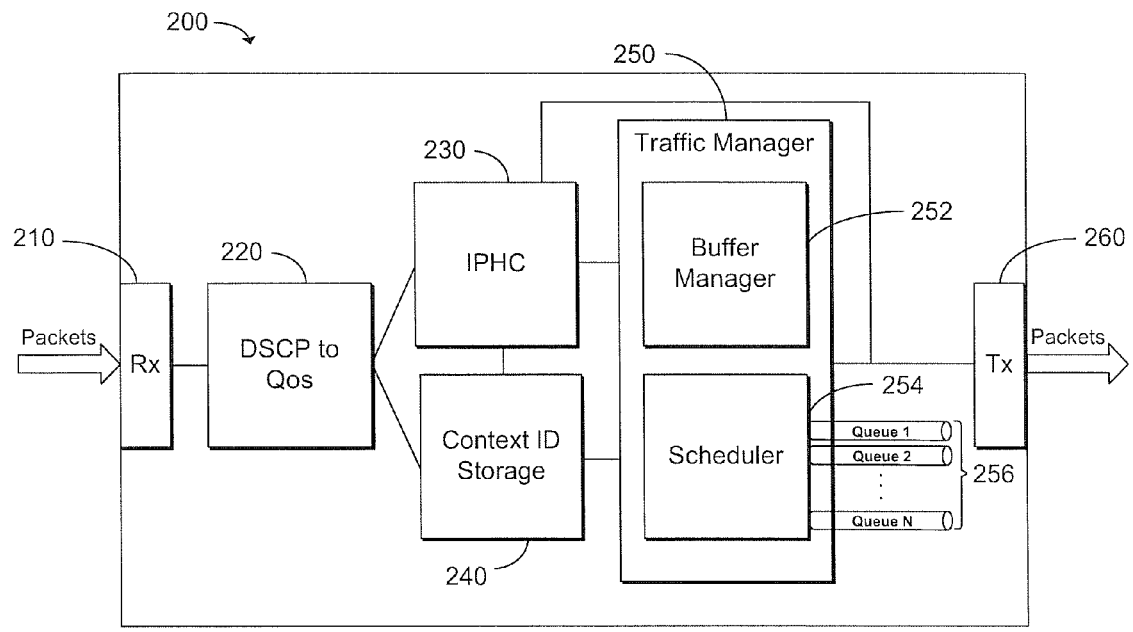
FIG. 2 is a schematic diagram of an exemplary network node implementing verification of header compression context identifiers for use in the system of FIG. 1.
FIG. 3 is a schematic diagram of an exemplary data arrangement for use in the context identifier storage of FIG. 2.

FIG. 2 is schematic diagram of an exemplary node 200 for use in system 100 of FIG. 1. In various exemplary embodiments, node 200 includes a receiver 210, a Differentiated Services Code Point (DSCP) to QoS module 220, an IP header compression module 230, context identifier storage 240, a traffic manager 250 including a buffer manager 252, a scheduler 254, and a plurality of queues 256, and a transmitter 260. As will be apparent from the following description, each of these components may communicate with one or more of the other components to implement the functionality of compressor 200.

Receiver 210 may include hardware and/or software encoded on a machine-readable storage medium configured to receive data from another network node. The hardware included in receiver 210 may be, for example, a network interface card that receives packets and other data. Thus, receiver 210 may be configured to receive a packet associated with a flow for which header compression and QoS provisioning is required. Receiver 210 may then provide this packet to DSCP to QoS module 220.

DSCP to QoS module 220 may include hardware and/or software encoded on a machine-readable storage medium configured to read a packet marking and assign a quality of service to the packet based on the packet marking. In particular, DSCP to QoS module 220 may include a table storing a correspondence between packet markings and the plurality of queues 256. These packet markings may be, for example, DSCP values transmitted in the Type of Service (ToS) field that specify a precedence of the packet and whether the packet requires low delay, high throughput, and/or high reliability. Alternatively, these markings may be Multi-Field Classification markings determined by analyzing multiple Layer 3 and Layer 4 header fields to identify a corresponding service class. Still further, these markings may be assigned based on an incoming interface. For example, high QoS traffic, medium QoS traffic, and low QoS traffic may each be received over a separate interface, such that the marking may be assigned based on the incoming interface. As described in further detail below, each of the queues 256 may provide a predetermined quality of service, such that the packets are forwarded according to the requirements specified in the packet marking.

IP header compression (IPHC) module 230 may include hardware and/or software encoded on a machine-readable storage medium configured to generate a full or compressed header including a context identifier. Thus, upon receipt of a packet associated with a flow at receiver 210, IPHC module 230 may access context identifier storage 240 to determine whether IPHC module 230 has already established a context identifier for the flow. When IPHC module 230 determines that a context identifier has already been assigned for the identified flow, IPHC module 230 may retrieve the assigned context identifier and generation from context identifier storage 240.

In contrast, when IPHC module 230 has not yet established a context identifier for the flow, IPHC module 230 may query context identifier storage 240 to identify a suitable context identifier. This context identifier may be, for example, an incremented or decremented value of the previous context identifier. Similarly, the generation value may be assigned by starting at 0 or the last-assigned value and incrementing for each subsequent generation.

After determining an existing context identifier or assigning a new one, IPHC module 230 may generate a full or compressed header. In particular, for the first packet in the flow and when a periodic update is required, IPHC module 230 may generate a full header including the context identifier and the generation. Alternatively, for subsequent packets, IPHC module 230 may generate a compressed header including the context identifier and the generation, but excluding one or more values from the packet header.

Context identifier storage 240 may comprise a set of context identifier information encoded on a machine-readable storage medium. Thus, context identifier storage 240 may be, for example, a table in a database that stores the information required to identify a flow, along with the context identifier and generation. Context identifier storage 240 may also store a QoS assigned to packets in the flow along with the context identification and flow information. The values stored in context identifier storage 240 may be updated each time a new flow is established or when certain fields in the flow change. For example, the values stored in context identifier storage 240 may be updated when a Time-to-Live (TTL) field changes, such that the generation is incremented and a slow start procedure is initiated. Thus, when IPHC module 230 assigns an expired context identifier to a new flow, context identifier storage 240 may be updated to reflect the new flow information and corresponding quality of service. An exemplary data arrangement for use in context identifier storage 240 is further described below with reference to FIG. 3.

Traffic manager 250 may include a buffer manager 252, scheduler 254, and a plurality of queues 256. Buffer manager 252 may include hardware and/or software encoded on a machine-readable storage medium configured to ensure that a buffer (not shown) in node 200 does not reach an overflow state. As described in further detail below in connection with FIG. 4, buffer manager 252 may perform its operations prior to IPHC module 230. Upon receipt of a packet in traffic manager 250, buffer manager 252 may query the buffer to determine whether the current occupancy of the buffer is greater than a predetermined threshold. When the current occupancy is greater than the threshold, buffer manager 252 discards the packet. Alternatively, when the current occupancy is less than or equal to the threshold, buffer manager 252 forwards the packet to IPHC module 230 for header compression.

Scheduler 254 may include hardware and/or software encoded on a machine-readable storage medium configured to manage quality of service provisioning in node 200. Thus, upon receipt of a packet, scheduler 254 may read the quality of service from the packet or otherwise determine the required quality of service, then place the packet in the corresponding queue. During regular periods of service (i.e. when there is no congestion), scheduler 254 may manage output of packets from each of the queues 256, preferentially outputting packets from higher priority queues.

During periods of congestion, scheduler 254 may block the output of packets from one or more of queues 256. Thus, scheduler 254 may, for example, block the output of low or medium priority queues, while continuing to output packets from high priority queues. As a result, forwarding of packets associated with a given flow may be delayed for a period. Furthermore, the flow may expire due to inactivity, such that the context identifier originally assigned to the flow is reassigned. When the context identifier is reassigned to a higher priority flow (e.g. high or medium priority flow) and a full header for the higher priority flow is sent to the decompressor, the decompressor will establish a new compression context. As a result, problems may arise if packets with compressed packet headers in the expired flow are sent, as these packets may be forwarded incorrectly or discarded when received at the decompressor. Furthermore, problems may arise if packets with full headers in the expired flow are sent, as this may reset the compression context at the decompressor, such that packets belonging to the new flow are dropped or decompressed incorrectly.

Scheduler 254 may implement a mechanism to ensure that expired packets with a reassigned context identifier are not forwarded after the period of congestion ends. In particular, after dequeueing the packet, scheduler 254 may determine whether the QoS associated with the packet is the same as the QoS stored in context identifier storage 240. In performing this comparison, the QoS associated with the packet may be determined, for example, based on the identity of the queue 256 from which the packet was dequeued, as each queue may be associated with a different QoS. In addition, the QoS stored in context identifier storage 240 may be determined by querying context identifier storage 240 using the context identifier retrieved from the header of the packet.

When the QoS associated with the packet is not the same as the QoS stored in context identifier storage 240, scheduler 254 may infer that the packet belongs to an expired or aged out flow with a reassigned context identifier and therefore discard the packet. Alternatively, when the QoS associated with the packet is the same as the QoS stored in context identifier storage 240, scheduler 254 may forward the packet towards its destination.

As described above, each of the plurality of queues 256 may be associated with a different quality of service. Thus, a first queue may be associated with real-time traffic that is sensitive to delays, such as Voice over IP (VoIP), video conferencing, and audio conferencing. A second queue may be associated with traffic that is less sensitive to delays, such as audio and video broadcasts. Finally, a number of other queues could be assigned to non-real time traffic, such as web browsing, chat, email, short message service (SMS), and other similar data transfers. Suitable assignments and configurations of queues 256 will be apparent to those of skill in the art.

Transmitter 260 may include hardware and/or software encoded on a machine-readable storage medium configured to send packets to another network node. The hardware included in transmitter 260 may be, for example, a network interface card that sends packets and other data. Thus, transmitter 260 may be configured to receive a packet outputted from one of the queues 256, then transmit the packet to a node serving as a decompressor in the telecommunications network.

FIG. 3 is a schematic diagram of an exemplary data arrangement 300 for use in the context identifier storage 240 of FIG. 2. Data arrangement 300 may be, for example, a table in a database stored in context identifier storage 240. Alternatively, data arrangement 300 could be a series of linked lists, an array, or a similar data structure. Thus, it should be apparent that data arrangement 300 is an abstraction of the underlying data; any data structure suitable for storage of this data may be used.

Data arrangement 300 may include three sets of data: flow information field 310, context ID field 320, and QoS field 330. Flow information field 310 may indicate any information necessary to uniquely identify a flow. Context ID field 320 may be a unique value assigned by IPHC module 240 to identify a compression context between a node operating as a compressor and a node operating as a decompressor. Context ID field 320 may optionally include the current generation value associated with the corresponding context identifier. Finally, as described above, QoS field 330 may indicate the QoS generated by DSCP to QoS module 220.

As an example, data 340 indicates the source IP address, source port, destination IP address, and destination port of a first flow. The context ID associated with this flow is 0, while the QoS associated with the flow is 7. As another example, data 350 indicates the source IP address, source port, destination IP address, and destination port of a second flow. The context ID associated with this flow is 1, while the QoS associated with the flow is 2. Data arrangement 300 may include numerous other data entries 360.

Figure 4:
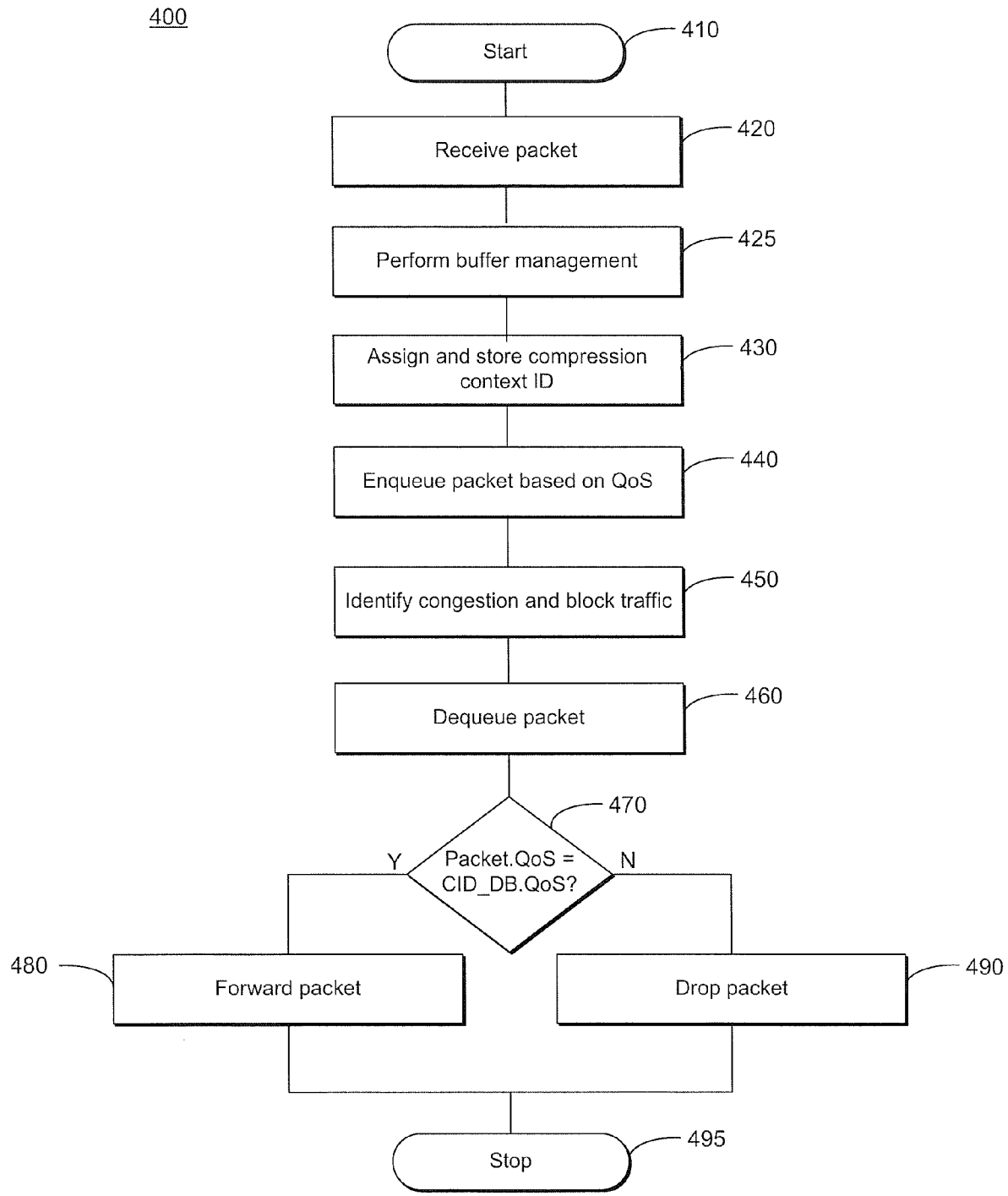
FIG. 4 is a flowchart of an exemplary method for verifying header compression context identifiers associated with packets outputted from a traffic manager in a network node.

FIG. 4 is a flowchart of an exemplary method 400 for verifying header compression context identifiers associated with packets outputted from a traffic manager 250 in a network node 200.

Exemplary method 400 starts in step 410 and proceeds to step 420, where node 200 receives a packet belonging to a flow for forwarding the packet towards a destination. The packet may include a marking indicating the priority of the packet. After receipt of the packet, a DSCP to QoS module may determine the QoS of the packet by accessing a table that stores a correspondence between packet markings and the QoS provided by each of a plurality of queues 256.

Exemplary method 400 then proceeds to step 425, where buffer manager 252 of traffic manager 250 determines whether there is sufficient space in the buffer to queue the packet. When there is insufficient space for the packet, buffer manager 252 discards the packet. Otherwise, buffer manager 252 forwards the packet to IPHC module 230 for compression processing. It should be apparent that, because buffer manager 252 makes this determination before compression in IPHC module 230, method 400 will not discard packets chosen to include full headers for establishing or refreshing a compression context. In contrast, if the functions of buffer manager 252 were performed after IPHC module 230, buffer manager 252 could conceivably discard these full headers, such that the decompressor would discard or incorrectly decompress subsequent packets due to an out-of-date or non-existent compression context.

After performing buffer management in step 425, exemplary method 400 proceeds to step 430, where IPHC module 230 assigns a compression context identifier to the packet. In particular, IPHC module 230 may first determine whether a context identifier has been assigned to the flow. When IPHC module 230 determines that a context identifier has already been assigned for the identified flow, IPHC module 230 may retrieve the assigned context identifier and generation from context identifier storage 240. In contrast, when IPHC module 230 has not yet established a context identifier for the flow, IPHC module 230 may query context identifier storage 240 to identify a suitable context identifier. After determining an existing context identifier or assigning a new one, IPHC module 230 may generate a full or compressed header including the context identifier and generation.

Exemplary method 400 then proceeds to step 440, where scheduler 254 of traffic manager 250 enqueues the packet based on the packet marking. In particular, scheduler 254 may access a QoS associated with the packet by DSCP to QoS module 220 or otherwise determine the QoS corresponding to the packet marking. Scheduler 254 may then enqueue the packet in the queue 256 corresponding to the determined QoS.

After queueing of the packet in step 440, exemplary method 400 proceeds to step 450, where scheduler 254 identifies a period of congestion and blocks lower priority traffic. In particular, scheduler 254 may block the output of packets from one or more lower priority queues, such that the higher priority data may flow uninterrupted.

Exemplary method 400 then proceeds to step 460, where scheduler 254 determines that the period of congestion has ended and dequeues packets that were previously blocked in step 450. In the event that the flow associated with a packet expired and the corresponding context identifier was reassigned, problems may arise when the delayed packets are sent to the decompressor.

Accordingly, exemplary method 400 proceeds to decision step 470, where scheduler 254 determines whether the QoS associated with the packet is the same as the QoS stored in context identifier storage 240. As described above, the QoS associated with the packet may be determined, for example, based on the identity of the queue 256 from which the packet was dequeued. In addition, the QoS stored in context identifier storage 240 may be determined by querying context identifier storage 240 using the context identifier retrieved from the header of the packet.

When, in decision step 470, scheduler 254 determines that the QoS associated with the packet is the same as the QoS stored in context identifier storage 240, scheduler 254 may infer that the context identifier associated with the flow has not been reassigned. Accordingly, method 400 may proceed to step 480, where scheduler 254 forwards the packet towards its destination using transmitter 260. Exemplary method 400 then proceeds to step 495, where method 400 stops.

On the other hand, when, in decision step 470, scheduler 254 determines that the QoS associated with the packet is not the same as the QoS stored in context identifier storage 240, scheduler 254 may infer that the packet belongs to an expired or aged out flow with a reassigned context identifier. Thus, method 400 may proceed to step 490, where scheduler 254 discards the packet. Exemplary method 400 then proceeds to step 495, where method 400 stops.

As an example of the operation of node 200 and method 400, suppose a first flow is assigned context identifier 1 and a number of packets in the flow are placed in a low priority queue. Further suppose that a period of congestion occurs after these packets are queued, the flow subsequently expires, and context identifier 1 is assigned to a new flow with a high or medium priority QoS. Because the QoS of the new flow is higher than the first flow, the full header assigned to the new flow may be sent before the packets of the first flow in the low priority queue, thereby establishing a new compression context with the decompressor.

Various exemplary embodiments implement a mechanism to ensure that the expired packets in the lower priority queue do not interfere with the compression context of the new flow. In particular, by determining whether the QoS associated with the expired packets is different than the QoS currently associated with the context identifier, node 200 may ensure that these packets are discarded.

According to the foregoing, various exemplary embodiments ensure a conflict-free interaction of packet header compression and traffic management functions in a network node. In particular, the various exemplary embodiments ensure that full header packets belonging to an expired flow with a given context identifier do not interfere with the compression context established when the context identifier is reassigned. As an example, the various exemplary embodiments ensure that full header packets belonging to an expired flow are not transmitted, as this could cause the decompressor to discard packets belonging to the flow with the reassigned context identifier. Furthermore, the various exemplary embodiments ensure that compressed packets associated with an expired flow are not sent to a decompressor after a new compression context is established, thereby reducing the possibility of errors at the ultimate destination of the packets.

It should be apparent from the foregoing description that various exemplary embodiments of the invention may be implemented in hardware, firmware, and/or software. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g. router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A method for verifying header compression context identifiers associated with packets outputted from a network node, the method comprising:
   receiving, at the network node, a packet belonging to a flow, the packet including a quality of service (QoS) level required for the flow;
   assigning a compression context identifier to the packet as an associated context ID;
   storing, in a context ID table stored in a context ID storage, an entry establishing a correspondence between the flow, the required QoS value, and an associated context ID, wherein the associated context ID is a compression context identifier;
   generating an compressed header that includes the associated context ID;
   queuing the packet in a selected queue in a plurality of queues in a traffic manager based on the required QoS level of the flow;
   blocking the packet when a period of congestion in the traffic manager is identified;
   dequeuing the packet from the selected queue when the period of congestion has ended;
   comparing the QoS level of the packet with a QoS level corresponding to the associated context ID in the context identifier table;
   determining that the flow has expired when the QoS level of the packet is not the same as the QoS level corresponding to the associated context ID in the context ID table; and
   discarding the packet when the flow has expired.

2. The method of claim 1, further comprising:
   determining whether an occupancy of a buffer is greater than a threshold level; and
   discarding the packet prior to the assigning step when the occupancy is greater than the threshold level.

3. The method of claim 1, further comprising:
   determining that the flow is active when the QoS level of the packet is the same as the QoS level corresponding to the associated context ID in the context ID table; and
   forwarding the packet when the flow is active.

4. The method claim 1, wherein the marking in the QoS level is based on a value from the group consisting of:
   a Differentiated Services Code Point (DSCP) marking, a multi-field classification marking, and a QoS marking determined based on a corresponding Layer 3 interface.

5. The method of claim 1, wherein the selected queue is a low-QoS-level queue and the associated context identifier is subsequently reassigned to a new flow with a medium QoS level or a high QoS level.

6. The method of claim 1, wherein the selected queue is a medium-QoS-level queue and the associated context identifier is subsequently reassigned to a new flow with a high QoS level.

7. The method of claim 1, wherein the QoS level of the packet is based on the QoS level associated with the selected queue.

8. The method of claim 1, wherein the QoS level for the associated context ID in the context identifier table is updated each time a new flow is established with the associated context identifier.

9. A network node implementing verification of header compression context identifiers outputted from the network node, the network node comprising:
   a receiver that receives a packet belonging to a flow, the packet including a quality of service (QoS) level required for the flow;
   a context identifier (ID) storage comprising:
      a context ID table that stores an entry establishing a correspondence between the flow, the required QoS value, and an associated context ID, wherein the associated context ID is a compression context identifier;
   an IP header compression (IPHC) module that receives the packet and generates a compressed header including the associated context ID; and
   a traffic manager coupled to the IPHC module and the context ID storage comprising:
      a plurality of queues, each queue associated with a predetermined quality of service (QoS) level, and
      a scheduler coupled to the plurality of queues that:
         receives the packet including the compressed header;
         queues the packet in a selected queue from the plurality of queues based on the required QoS level of the flow,
         blocks the packet when a period of congestion is identified,
         dequeues the packet from the selected queue when the period of congestion has ended,
         compares the QoS level of the packet with a QoS level corresponding to the associated context ID in the context ID table, and
         determines that the flow has expired when the QoS level of the packet is not the same as the QoS level corresponding to the associated context ID in the context ID table; and
         discards the packet when the flow has expired.

10. The network node of claim 9, wherein the traffic manager further comprises:
   a buffer manager that:
      determines whether an occupancy of a buffer is greater than a threshold level; and
      discards the packet prior to receipt by the IPHC module when the occupancy is greater than the threshold level.

11. The network node of claim 9, wherein the scheduler:
   determines that the flow is active when the QoS level of the packet is the same as the QoS level corresponding to the associated context ID in the context ID table; and
   forwards the packet when the flow is active.

12. The network node of claim 9, wherein the QoS level is based on a value from the group consisting of:
   a Differentiated Services Code Point (DSCP) marking, a multi-field classification marking, and a QoS marking determined based on a corresponding Layer 3 interface.

13. The network node of claim 9, wherein the selected queue is a low-QoS-level queue and the associated context identifier is subsequently reassigned to a new flow with a medium QoS level or a high QoS level.

14. The network node of claim 9, wherein the selected queue is a medium-QoS-level queue and the associated context identifier is subsequently reassigned to a new flow with a high QoS level.

15. The network node of claim 9, wherein the scheduler determines the QoS level of the packet based on the QoS level associated with the selected queue.

16. The network node of claim 9, wherein the QoS level for the associated context ID in the context identifier table is updated each time a new flow is established with the associated context identifier.

* * * * *